Patented Sept. 17, 1929

1,728,766

UNITED STATES PATENT OFFICE

HOBART M. KRANER, OF WILKINSBURG, PENNSYLVANIA, ASSIGNOR TO WESTINGHOUSE ELECTRIC & MANUFACTURING COMPANY, A CORPORATION OF PENNSYLVANIA

METHOD OF SALT GLAZING IN COLORS

No Drawing.   Application filed October 8, 1927.   Serial No. 225,032.

My invention relates to ceramic materials containing clay, as an essential ingredient, and more particularly to a method of glazing the surface of articles made from such materials.

The object of my invention is to provide a novel method of glazing articles made from clay or other ceramic materials containing clay that economically and effectively produces upon their surfaces an adherent coating of the desired color, and, by means of which the articles may be rendered impervious to water and other liquids.

Another object of the invention is to provide a method of producing glazes upon articles made from clay, or other ceramic materials, that consists, essentially, in volatilizing a mixture of sodium chloride and another metallic chloride in the firing kiln while the articles are being fired, under such conditions that the chlorides will be decomposed and metal oxides formed which unite chemically with the alumino-silicates present in the material to form a smooth, adherent glaze of the desired color.

Clays, or clay mixed with other substances, upon suitable treatment, including the addition of water, form plastic bodies which may be extruded, molded or otherwise shaped into tiles, pipes, terra cotta, earthenware or other articles. Such articles are usually fired in a kiln, and the color of the fired product is essentially determined by the amount of iron or other metallic compounds that are present, as impurities, in the clay. It is difficult to obtain a desirable color in this manner, as the temperature that produces the most desirable color is not generally the temperature at which the fired product has the greatest strength and, even when the material or articles are heated in a suitable atmosphere at a suitable temperature, other colored impurities are usually present in the raw material which prevents the formation of a suitable color.

As the proper coloring of finished ceramic bodies is a very desirable property and one which contributes greatly to their value, it is essential that some means be provided to overcome these difficulties. One method is to add a colored substance to the raw material, so as to mask any undesirable color and to give the finished article the desired tint, and another method is to coat the article with an engobe of another material, or a glaze, which burns to the desired color. In the former case, it is necessary to glaze the material to protect and render it impervious to water and other liquids. Such a glaze may be applied by dipping, brushing or spraying, and should be of such composition that it will firmly adhere to the article.

An economical and very effective method of producing a transparent glaze upon ceramic products is by the volatilization or salt glazing method which consists in introducing moist common salt into the firing kiln when the ceramic body is at a sufficiently high temperature. The salt is decomposed by the heat and moisture, forming sodium oxide which combines with the alumino-silicates in the clay at the surface of the article to form a layer of complex silicates. The chloride reacts with the hydrogen present in the moisture or in the furnace gases of the kiln, and escapes as hydrochloric-acid fumes. Such a method produces a satisfactory glaze when applied to ceramic products that have been properly colored; but, being transparent, it is not entirely satisfactory when applied to products that have developed an undesirable color during the firing process.

I have made the discovery that, when a metallic chloride, or a mixture of metallic chlorides that are capable of being volatilized and the oxides of which produce desirable coloring effects, are mixed with sodium chloride and introduced into a kiln, at a suitable temperature, while the ceramic bodies are being fired, the chlorides will be volatilized and decomposed by the heat, forming metallic oxides and hydrochloric-acid fumes.

The metallic oxides, including the sodium oxide, combine with the alumino-silicates in the clay, forming complex silicates in the same manner that sodium oxide combines with the alumino-silicates in the salt glazing process, but the introduction of the metallic oxides into the product produces a coloring effect which may be varied according to the metallic chloride, or mixture of metallic chlorides, that are introduced.

In practicing my invention, suitably shaped articles made from clay, or ceramic materials containing clay, or other substances containing alumina and silica, are placed in a firing kiln, and a mixture of one or more of the metallic chlorides and sodium chloride are introduced into the kiln when it has reached a temperature that will volatilize the salt and form a suitable glaze, usually at about 1200° C. It is sometimes desirable to add the chlorides to the kiln while in a moist condition, but this is not essential, as good results have been obtained when they are dry.

The volatilization and decomposition of the salts produce a rapid lowering of the temperatures and it is, therefore, preferable not to add all the salt at one time, but divide it into batches which are added at intervals of 20 to 30 minutes, the temperature being increased between the intervals by refiring the kiln. I have found that the amount of salt and metallic chlorides required to produce a satisfactory colored glaze, varies from one-half to one and one-half pounds per cubic foot capacity of the kiln, of which amount the metallic chlorides which produce colored oxides may be added in an amount ranging up to 50% of the total salt mixture. When the salt mixture is added, the draft in the kiln should be reduced to the minimum, so that the salt vapors may not be carried off before they have the opportunity to unite with the articles to be glazed.

Highly aluminous or distinctly basic wares cannot be treated in this manner, as the colored salt glaze will only form on ceramic articles having a ratio of alumina to silica within a definite range. Clays containing from one part alumina to from 4.6 to 12.5 parts of silica have been found especially desirable, and, where ceramic material is mentioned in the specification and claims, it will be understood that they refer to ceramic bodies containing clay, or ceramic materials containing alumina and silica in which the ratio of alumina to silica is within the proportions specified.

The metallic chloride added to the sodium chloride to produce my improved product may be any metallic chloride that is capable of being volatilized and the oxide of which will produce the desired color. Cobalt chloride, when mixed with sodium chloride and volatilized in the manner specified, produces a glaze having a blue color. A mixture of chromium and cobalt chloride with sodium chloride produces a glaze having a lilac color, while iron chloride mixed with sodium chloride produces a glaze having a brown color.

My novel method of applying a colored glaze to ceramic articles not only provides a satisfactory coloring effect that makes unnecessary the addtiion of expensive coloring matter throughout the entire mass of the raw material but, as the oxides combine with the alumino-silicates in the article which is being colored, the glaze will be in intimate contact or bond with the article.

While I have described a specific embodiment of my invention, it will be understood that various changes may be made therein without departing from the spirit and scope of my invention as defined in the appended claims.

I claim as my invention:

1. The method of glazing ceramic materials which comprises volatilizing a mixture of sodium chloride and another metallic chloride, the oxide of which will combine with silica to produce a colored silicate, in the presence of the ceramic material.

2. The method of glazing ceramic materials which comprises volatilizing a mixture of sodium chloride and one or more other metallic chlorides, the oxides of which will combine with silica to produce a colored silicate, in the presence of a ceramic material.

3. The method of glazing a ceramic article which comprises placing the article in a kiln and volatilizing a mixture of metallic salts, including sodium chloride and a volatile metallic salt, the oxide of which will combine with an ingredient of the ceramic article to form a colored compound, in the kiln at such a temperature that a colored glaze will be formed upon the surface of the article.

4. The method of glazing a ceramic article which comprises placing the article in a kiln and volatilizing a mixture of moist metallic salts, including sodium chloride and a volatile metallic salt, the oxide of which will combine with one or more of the ingredients of the ceramic article to form a colored compound, in the kiln, at such a temperature that a colored glaze will be formed upon the surface of the article.

5. The method of glazing a ceramic material which comprises placing the ceramic material in a suitable kiln and introducing a mixture of salts, including sodium chloride and another metallic chloride, the oxide of which will combine with silica to produce a colored silicate, into the kiln at a temperature sufficient to volatilize the salts and form a glaze on the surface of the material.

6. The method of glazing a ceramic article containing clay as an essential ingredient which comprises volatilizing sodium chloride and another metallic chloride, the oxide of which combines with silica to produce a colored silicate, in the presence of the article, at such a temperature that the chlorides will be decomposed and metal oxides formed which combine with the alumino-silicates in the clay, forming a colored glaze.

7. The method of glazing a ceramic article containing clay as an essential ingredient, which comprises volatilizing sodium chloride and a mixture of other metallic chlorides, the oxides of which combine with silica to produce a colored silicate, in the presence of the article, at such a temperature that the chlorides will be decomposed and metallic oxides formed which combine chemically with the alumino-silicates in the clay, forming a colored glaze.

8. The method of glazing a ceramic article containing clay as a principal ingredient which comprises placing the articles in a kiln and introducing a mixture of sodium chloride and one or more other metallic chlorides, the oxides of which combine with silica to produce a colored silicate, into the kiln at such a temperature that the chlorides will be decomposed and metal oxides formed which combine chemically with the alumino-silicates in the clay and form a colored glaze.

9. The method of glazing a ceramic article containing clay as an essential ingredient which comprises placing the article in a kiln and introducing a mixture of salts into the kiln, including sodium chloride and one or more other metallic chlorides, the oxides of which combine with silica to produce a colored silicate, at such a temperature that a colored glaze will be formed upon the article, said metallic chlorides constituting up to 50% of the salt mixture.

In testimony whereof, I have hereunto subscribed my name this 6th day of October, 1927.

HOBART M. KRANER.